United States Patent
Bailey et al.

(10) Patent No.: US 8,467,775 B2
(45) Date of Patent: Jun. 18, 2013

(54) DIGITAL DATA COMPRESSION IN A CELLULAR PHONE

(75) Inventors: Kenneth Stephen Bailey, Newport Beach, CA (US); Christopher Carmichael, Laguna Niguel, CA (US)

(73) Assignee: Ubiquity Holdings, San Juan Capistrano, CA (US)

( * ) Notice: Subject to any disclaimer, the term of this patent is extended or adjusted under 35 U.S.C. 154(b) by 909 days.

(21) Appl. No.: 11/852,927

(22) Filed: Sep. 10, 2007

(65) Prior Publication Data
US 2008/0299956 A1   Dec. 4, 2008

Related U.S. Application Data

(60) Provisional application No. 60/844,207, filed on Sep. 12, 2006.

(51) Int. Cl.
*H04L 29/06* (2006.01)

(52) U.S. Cl.
USPC ............. 455/414.3; 455/414.4; 455/412.1; 455/419; 455/566; 345/2.1; 345/3.3; 345/1.1

(58) Field of Classification Search
USPC ........ 455/414.4, 412.1, 419, 72, 566; 345/2.1, 345/3.3, 1.1
See application file for complete search history.

(56) References Cited

U.S. PATENT DOCUMENTS

| | | | |
|---|---|---|---|
| 7,072,932 B1* | 7/2006 | Stahl | 709/203 |
| 7,813,724 B2* | 10/2010 | Gronner et al. | 455/414.4 |
| 2003/0187930 A1* | 10/2003 | Ghaffar et al. | 709/205 |
| 2004/0073912 A1* | 4/2004 | Meza | 719/321 |
| 2006/0234765 A1* | 10/2006 | Herberger et al. | 455/552.1 |
| 2008/0027953 A1* | 1/2008 | Morita et al. | 707/100 |
| 2008/0072261 A1* | 3/2008 | Ralston et al. | 725/62 |
| 2008/0139201 A1* | 6/2008 | Frid-Nielsen et al. | 455/426.2 |
| 2009/0234862 A9* | 9/2009 | Begeja et al. | 707/100 |
| 2010/0255877 A1* | 10/2010 | Sarma | 455/557 |

* cited by examiner

*Primary Examiner* — Kwasi Karikari
(74) *Attorney, Agent, or Firm* — Law Office of Scott C. Harris, Inc.

(57) ABSTRACT

Video clips are stored and converted on a website into different formats which are compatible with different cellular phones. The source for the video can be sources such as DVDs, other cellular phones, or broadcast television. The system can automatically store profiles from multiple different phones and automatically carry out a conversion based on information stored in the profile.

13 Claims, 5 Drawing Sheets

HOST'S LOGIN SCREEN

INTERNET MEDIA EXPERIENCE

LOGIN (Cellular Phone Number): _____ /— 100

CELLULAR PROVIDER: _____ /— 105

TYPE OF PHONE _____ /— 110
            (Brand)   (Model)

IF GSM DO YOU HAVE GPRS?  Y___ N___

SELECTION MENU

| INPUT SOURCE | OUTPUT DESTINATION |
|---|---|
| HD - TV | HD - TV |
| DVD | DVD |
| CELLULAR | CELLULAR |
| PDA | PDA |
| OTHER | OTHER |

DIGITAL DATA COMPRESSION IN A CELLULAR PHONE

CROSS-REFERENCE TO RELATED APPLICATIONS

This application claims priority to U.S. Provisional Application 60/844,207, filed Sep. 12, 2006. The disclosure of the prior application is considered part of (and is incorporated by reference in) the disclosure of this application.

BACKGROUND

Data compression allows storing more data in a smaller space, and later reconstructing the original data. The use of data compression may allow improved use of limited bandwidth over channels such as cellular networks.

It is important that many different clients be able to decompress video which has been compressed using various techniques. Accordingly, the decompression process typically is kept simple to avoid the requirement of special hardware to decompress. However, the compression process can be extremely complicated, since specialized hardware can be used for the compression.

SUMMARY

The present application teaches a compression process intended to be used on a cellular phone over a cellular network.

BRIEF DESCRIPTION OF THE DRAWINGS

FIG. 1A illustrates the host login screen;

FIG. 1B illustrates a selection menu;

DETAILED DESCRIPTION

Figure 2:
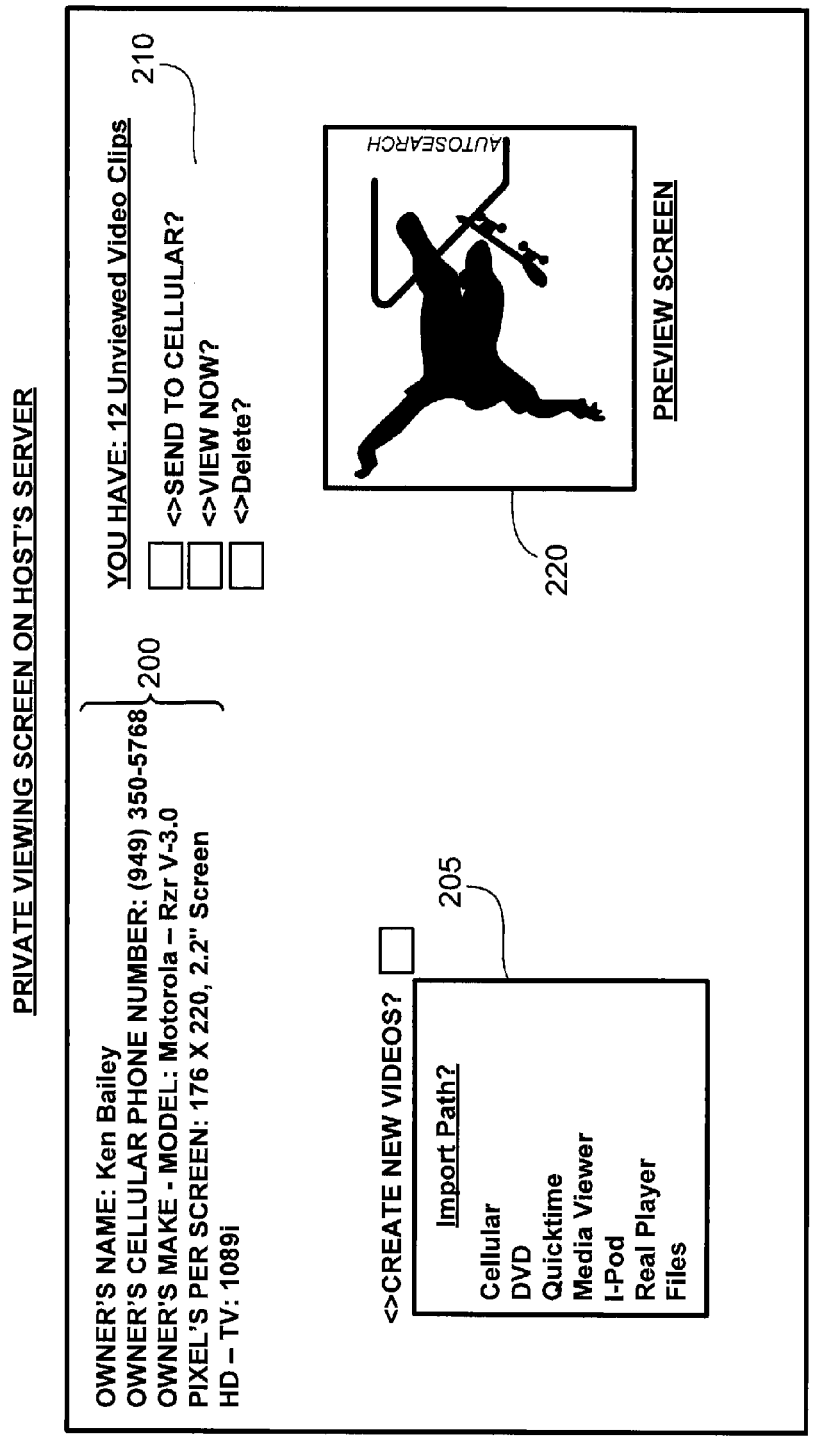
FIG. 2 illustrates an exemplary screen.

The general structure and techniques, and more specific embodiments which can be used to effect different ways of carrying out the more general goals, are described herein.

The present application operates by allowing users to connect to a host website using their cellular phone. While attached to the host website, the users can view motion pictures of streaming video on the display of the cellular phone. In an embodiment, the cellular phone has a special adapter that is externally attached to the data port of the cellular phone. This special adapter uses very large scale integration "VLSI" chips to carry out decompression of the received information.

An embodiment uses extremely aggressive motion estimation algorithms for the compression and decompression, in order to attempt to obtain a ratio as high as 1000:1 compression ratio. The wavelet transform decomposes the image into different resolutions (or scales). One usually refers to these as averages and details. However, there are different levels of detail resolution and one of the parameters that we can select is the number of levels we decompose the image. One usually refers to the details to describe "the finest scale", hierarchically down to the "coarsest" scale. In order to reconstruct the image it is necessary to transmit information about not only the magnitude of the wavelet transform coefficients, but also the position of the significant transform coefficient. This means that for each wavelet coefficient, we need to provide three numbers; magnitude plus the location in x and y. One of the challenges for transmitting wavelet transformed data efficiently is to use redundancy in the location description such that not each individual position has to be transmitted independently. A challenge in streaming media is to transmit the most significant pieces of information first. By doing this, all is not lost even if the bitstream is interrupted pre-maturely. This also provides an easy way to adjust the protocol for different bit budgets. This is referred to as progressive transmission, and may also be used in this system.

Since the decoder is a single purpose device, separate from the phone, it can be of any level of complexity.

In an embodiment, a cellular phone display may have the ability to view images that have many different forms, for example, 245×320 pixels. Such a phone requires 76,800 pixels per frame. If the streaming video is sent at a refresh rate of 24 frames per second, this means that about 442 million pixels of streaming data is necessary. Taking the Verizon™ network of CDMA networks as an example, which has a baud rate of 400,000 bits per second, this would require about 18½ minutes. At a compression rate of 250:1, this could be accomplished in about 4½ seconds and would require much less bandwidth and memory storage.

In addition, the module may store a number of images, which can be displayed as part of the displayed video. In addition, the module stores compression and decompression algorithms that allow more efficient transferring of large images over the network.

An operating system can also be downloaded to the attachment module.

FIG. 1A indicates the host login screen, that requires the user to connect. FIG. 1 shows entering (or otherwise obtaining) a user's mobile telephone number, and, their cellular provider 105, and type of phone 110. This information may also be automatically detected.

Other information about the phone and/or its connection may also be obtained, for example, whether the phone has GPRS.

Once connected, the user is provided with a selection menu shown in FIG. 1B. This requires selecting both the input source from the selection menu: High definition TV, DVD, cellular, PDA and other. The output destination can also be selected from high definition TV, DVD, cellular, and other. Once selected, the website will carry out a conversion operation.

FIG. 2 illustrates an exemplary screen. This shows the owners personal information 200 including name, cellular phone number, and the like. A 'CREATE NEW VIDEOS' menu 205 is also shown. The 'CREATE NEW VIDEOS' selects an import path from which the videos can be created. Once created, the videos are resident on the website, shown by the section 210, which also shows how many video clips the user has, and allows sending them to the cellular phone, viewing or deleting. A preview screening 220 can also be provided.

Figure 3:
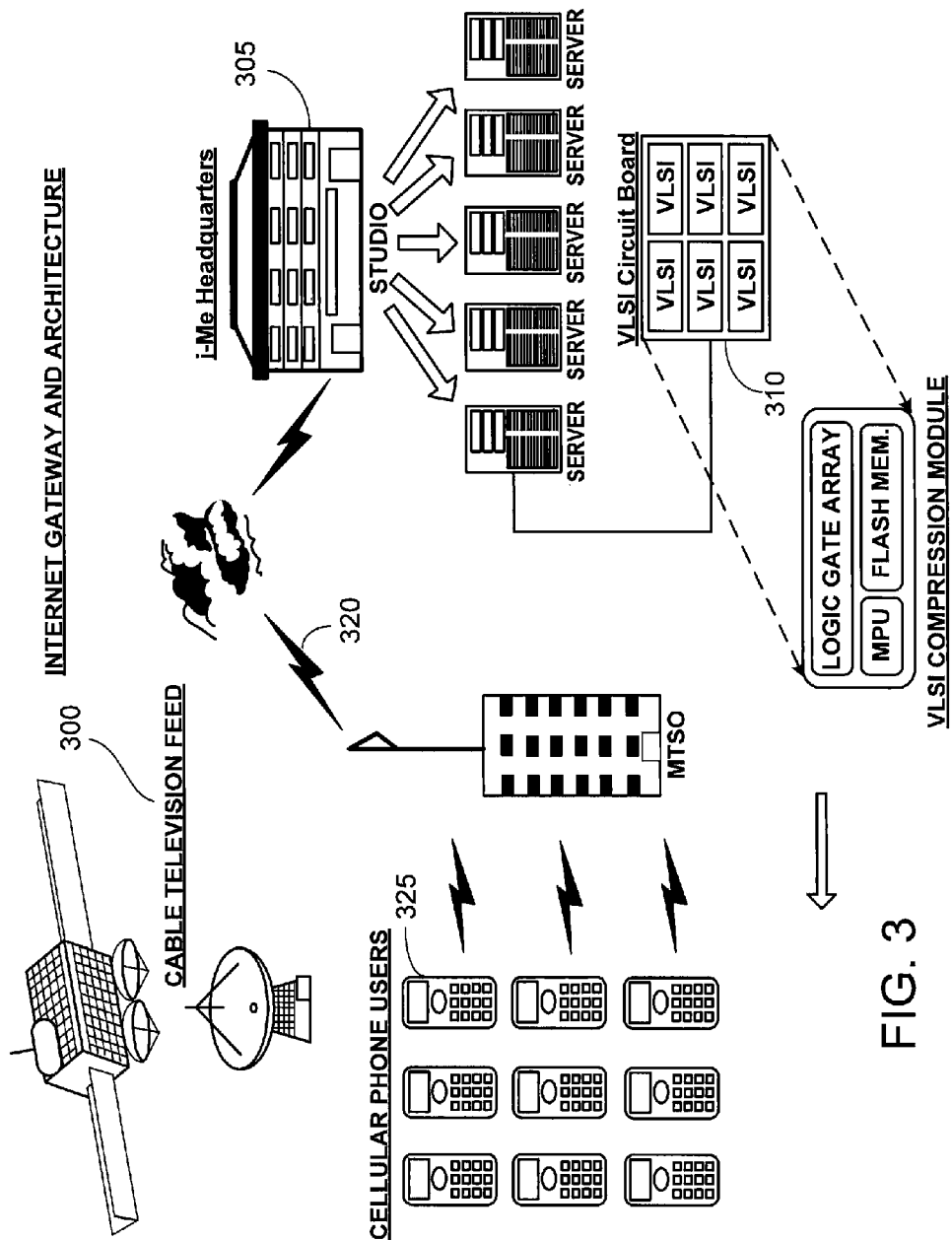
FIG. 3 illustrates how a cable television feed can be selected.

In operation, the user can select a video from any desired source to be sent to the website, converted, and eventually sent to the telephone. For example, FIG. 3 illustrates how a cable television feed can be selected, received by the website at 305, converted by the VLSI board into a motion compensated and aggressively compressed video image, and then sent over the cellular carrier 322 to the cellular phone 325. This architecture allows any feed—such as from a cable television—to be selected by a user on a website, aggressively compressed, and sent to the mobile phone for later usage.

According to one aspect, much of the compression is done in VLSI circuitry, thereby enabling more aggressive compression of that information.

Figure 4:
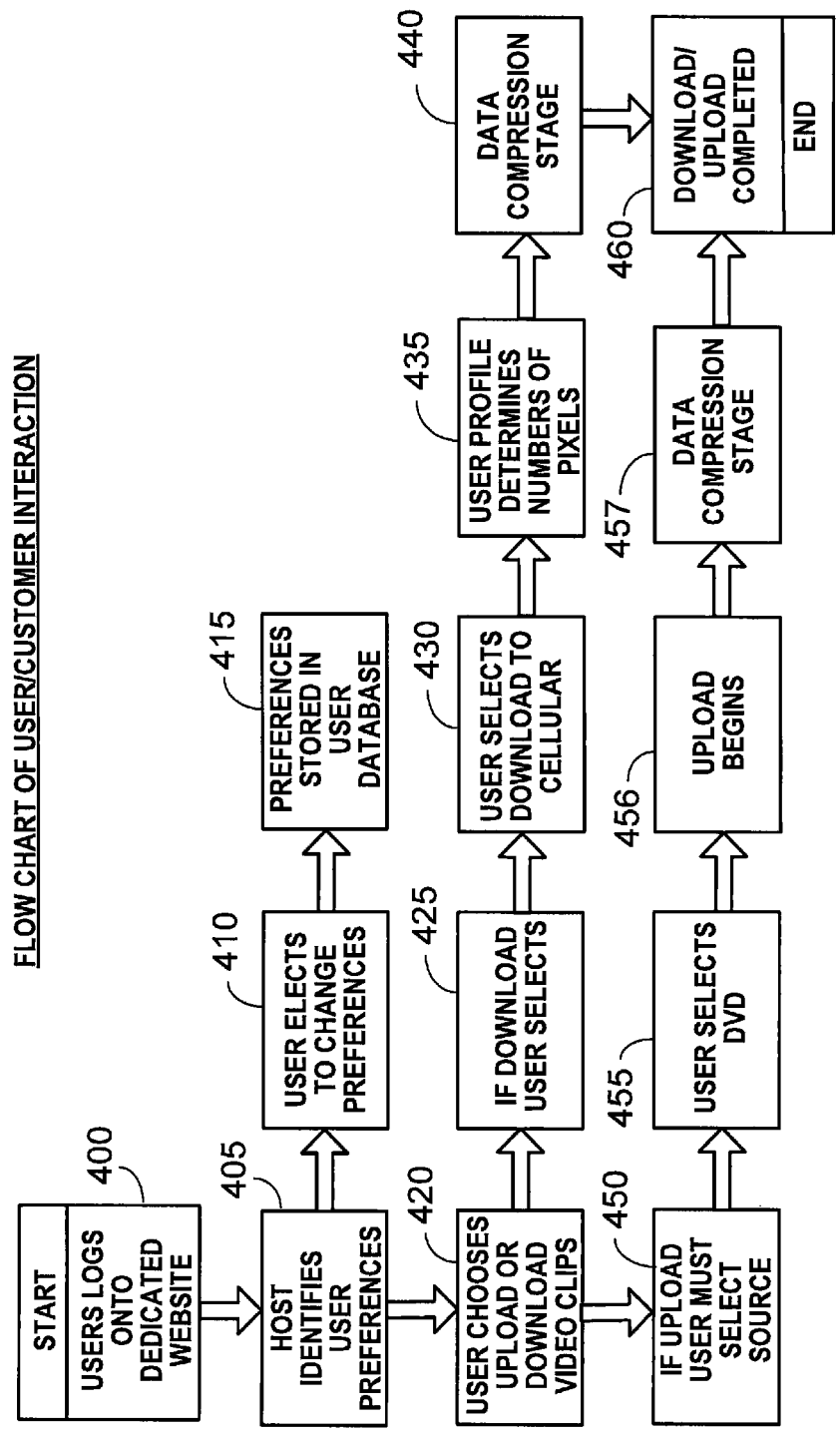
FIG. 4 illustrates a flowchart of the operation of customer interaction.

FIG. 4 illustrates a flowchart of the operation of customer interaction. At 400, the user logs on to a website, and identifies the preferences at 405, using for example the screens shown in FIGS. 1A and 1B. The user can change preferences at 410, which preferences are then stored in the user database at 415. Alternatively, the user can choose to upload or download video clips at 420. If the download is selected, flow passes to 425, where the user selects a video, and selects download to cellular at 430. The user profile is then used to determine the number of pixels at 435. An aggressive data compression 440 is carried out, which passes control to the download process 460.

If the user selects uploading clips, the user then selects a source at 450, which may be, for example, a DVD at 455. Alternatively, the source may be cable television, or any other source. Uploading begins at 456, followed by a data compression stage at 457 where the data is aggressively compressed. Flow then passes to the upload/download process which allows the data to be downloaded.

Figure 5:
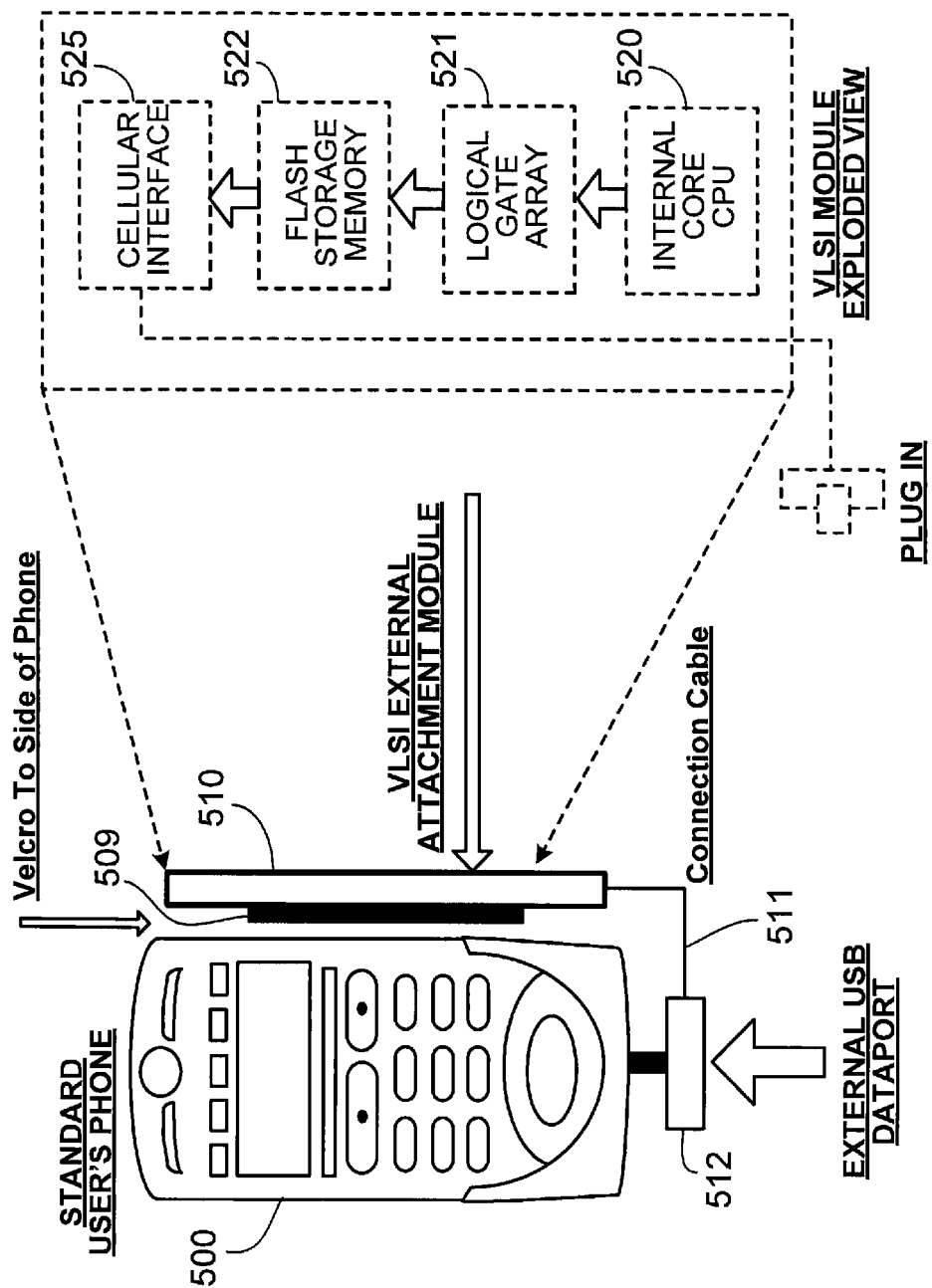
FIG. 5 illustrates a hardware diagram.

FIG. 5 illustrates a hardware diagram which shows the phone 500 and the attachment module 510 attached thereto. In the embodiment, the attachment module is connected by a hook and eye part 509 such as Velcro™ to the side of the phone. The attachment module has a cable 511 which is attached to a USB or other format data port 512. The VLSI module has a processor 520, a logical gate array 521 of flash memory storage 522, and a cellular phone interface 525. The logical gate array 521 may either be a programmable logic array that is reconfigurable according to downloaded instructions, or may be dedicated logic gates. Because dedicated hardware can be used to decompress the data, the data may be more aggressively compressed prior to sending to the cellular phone.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, the external module is optional and others could be used.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method, comprising:

on a website, allowing users to store profiles that indicate information that is indicative of a hardware within the user's cellular phone, wherein one item of information represents first hardware for a first user including information defining a specific number of pixels that are displayed by a display of the user's cellular phone, said specific number of pixels in a form of x pixels by y pixels, where x represents a number of pixels across the display in a first direction, and y represents a number of pixels across the display in a second direction orthogonal to the first direction, and another item of information represents second hardware for a second user;

said website having a computer allowing said first and second users to carry out operations with a video program, including all of a first operation that includes selecting a video program from stored video programs, a second operation that includes creating a video program on the website by uploading video from the user's cellular phone and a third operation that includes creating a video program on the website by recording a video program on the website from a source of television programs;

said computer on said website, storing plural different video compression algorithms, and automatically converting said video program to a compressed format compatible with said hardware in a way that is optimized for compressing for a specific hardware of the user's cellular phone including the specific number of pixels in the form of x pixels by y pixels forming the display of the first cellular phone, as indicated by the stored profile for the user; and storing said automatically converted video information and sending said automatically converted video information to at least one of different cellular telephone users, said automatically converted video information having different characteristics when sent to said first user than it has been sent to said second user.

2. A method as in claim 1, wherein said source of television programs is a cable television feed.

3. A method as in claim 1, wherein said source of television programs is television from a satellite.

4. A method as in claim 1, further comprising receiving information indicative of video information indicates a time when the video information will play, and wherein said website automatically receives said video information when it plays and converts said video information.

5. A method as in claim 1, wherein said website further comprising prompting a user to enter cellular information indicative of their telephone number on a cellular provider, and automatically determining information about the user's specific type of cellular phone based on said information, wherein said website finds information that is indicative of the hardware of the user's specific cellular phone based on said telephone number, without the user entering specific information identifying the hardware.

6. A method as in claim 5, wherein the website finds said information indicative of screen capacity and number of pixels to send for converted video clip based on said phone number, without the user entering said number of pixels.

7. A method as in claim 6, wherein said automatically converting comprises automatically compressing said video information in a first way to have a first number of pixels for a first cellular phone, and automatically converting said video information in a second way to have a second number of pixels different than said first number of pixels, for a second cellular phone.

8. A method, comprising:
on a website, allowing users to store profiles that indicate information that is indicative of a hardware within the user's cellular phone, wherein one profile represents first hardware for a first user including information defining a specific number of pixels that are displayed by a display of the user's cellular phone, said specific number of pixels in a form of x pixels by y pixels, where x represents a number of pixels across the display in a first direction, and y represents a number of pixels across the display in a second direction orthogonal to the first direction, and another profile represents second hardware for a second user;
said website having a computer allowing said user to carry out operations with a video program, including a first operation that includes selecting a video program from stored video programs, a second operation that includes creating a video program on the website by uploading video from the user's cellular phone and a third operation that includes creating a video program on the website by recording a video program on the website from a source of television programs;
said computer on said website, storing plural different video compression algorithms, and first automatically converting said video program to a compressed format compatible with said hardware in a way that is optimized for compressing for a specific hardware of the user's cellular phone, as indicated by the stored profile for the user, and to have a first number of pixels for a first cellular phone including the specific number of pixels in the form of x pixels by y pixels forming the display of the user's cellular phone, and automatically converting said video program in a second way to have a second number of pixels different than said first number of pixels, for a second cellular phone, while compressing said video program according to said number of pixels.

9. A method as in claim 8, wherein said source of television programs is a cable television feed.

10. A method as in claim 8, wherein said source of television programs is a television program being broadcast from a satellite.

11. A method as in claim 8, further comprising, on said website, allowing plural converted video clips to be stored, and allowing selection of one of said video clips to view at a first time, and allowing selection of at least one video clip to send to said cellular phone at a second time.

12. A method as in claim 8, further comprising automatically determining on said website, different characteristics of different cell phones based on information entered by a user that includes the users telephone on a cellular carrier but does not include information about the hardware of the users phone without the user entering specific information identifying the hardware, and automatically compressing and converting said video information in a first way to have a first number of pixels for a first cellular phone, and automatically converting said video information in a second way to have a second number of pixels different than said first number of pixels, for a second cellular phone.

13. A method as in claim 12, wherein the website determines said information indicative of screen capacity and number of pixels to send for a converted video clip based on said phone number, without the user entering said number of pixels.

* * * * *